United States Patent
Starr et al.

(10) Patent No.: US 9,158,467 B2
(45) Date of Patent: Oct. 13, 2015

(54) OPTIONAL DATA ENCRYPTION BY PARTITION FOR A PARTITIONABLE DATA STORAGE LIBRARY

(75) Inventors: Matthew Thomas Starr, Lafayette, CO (US); Jeff Robert Boyton, Fort Collins, CO (US); Nathan Christopher Thompson, Boulder, CO (US)

(73) Assignee: Spectra Logic Corporation, Boulder, CO (US)

( * ) Notice: Subject to any disclaimer, the term of this patent is extended or adjusted under 35 U.S.C. 154(b) by 3004 days.

(21) Appl. No.: 11/358,832

(22) Filed: Feb. 21, 2006

(65) Prior Publication Data

US 2007/0195447 A1 Aug. 23, 2007

(51) Int. Cl.
*G06F 12/14* (2006.01)
*G06F 3/06* (2006.01)
*G06F 21/62* (2013.01)
*H04L 9/32* (2006.01)
*G06F 21/78* (2013.01)
*G11B 20/00* (2006.01)

(52) U.S. Cl.
CPC .............. *G06F 3/064* (2013.01); *G06F 3/0608* (2013.01); *G06F 3/0623* (2013.01); *G06F 3/0686* (2013.01); *G06F 21/6218* (2013.01); *G06F 21/78* (2013.01); *G11B 20/0021* (2013.01); *G11B 20/00086* (2013.01); *G11B 20/00144* (2013.01); *G11B 20/00173* (2013.01); *G11B 20/00253* (2013.01); *G11B 20/00413* (2013.01); *G11B 20/00811* (2013.01); *H04L 9/3242* (2013.01); *G11B 2220/417* (2013.01); *G11B 2220/90* (2013.01)

(58) Field of Classification Search
USPC .............. 713/150–154, 162–167; 726/26–31; 710/62–74
See application file for complete search history.

(56) References Cited

U.S. PATENT DOCUMENTS

| | | | |
|---|---|---|---|
| 5,644,698 A * | 7/1997 | Cannon | 714/6 |
| 5,790,848 A | 8/1998 | Wlaschin | |
| 6,044,442 A | 3/2000 | Jesionowski | |
| 6,065,087 A | 5/2000 | Keaveny et al. | |
| 6,260,120 B1 * | 7/2001 | Blumenau et al. | 711/152 |
| 6,272,631 B1 * | 8/2001 | Thomlinson et al. | 713/155 |
| 6,505,138 B1 | 1/2003 | Leonard | |
| 6,754,798 B1 | 6/2004 | Peloquin et al. | |

(Continued)

OTHER PUBLICATIONS

Beyond backup toward storage management; Kaczmarski et al, IEEE, 2003.*

(Continued)

*Primary Examiner* — Luu Pham
*Assistant Examiner* — Jahangir Kabir
(74) *Attorney, Agent, or Firm* — Kenneth Altshuler

(57) ABSTRACT

Disclosed are a method and apparatus for a data storage library comprising a first and second drive, a first and second mobile medium, a first and second partition wherein the first partition comprises the first drive and the first mobile medium and the second partition comprises the second drive and the second mobile medium, and a combination bridge controller device. The combination bridge controller device is configurable to control first communication traffic between at least a first client and the first partition wherein the first communication traffic can comprise a first data package. The combination bridge controller device is further configurable to optionally encrypt the first data package for storage on the first mobile medium when the first mobile medium is in cooperation with the first drive.

15 Claims, 14 Drawing Sheets

(56) References Cited

U.S. PATENT DOCUMENTS

| | | | |
|---|---|---|---|
| 6,839,824 | B2 | 1/2005 | Camble et al. |
| 7,320,052 | B2* | 1/2008 | Zimmer et al. ............... 711/114 |
| 7,496,586 | B1* | 2/2009 | Bonwick et al. ............. 707/101 |
| 7,549,044 | B2* | 6/2009 | Lee et al. ...................... 713/167 |
| 7,681,048 | B2* | 3/2010 | Starr et al. ................... 713/193 |
| 8,255,705 | B2* | 8/2012 | Starr et al. ................... 713/193 |
| 8,850,231 | B2* | 9/2014 | Starr et al. ................... 713/193 |
| 8,930,687 | B1* | 1/2015 | Robinson et al. ............. 713/150 |
| 2003/0126225 | A1 | 7/2003 | Camble et al. |
| 2003/0126309 | A1 | 7/2003 | Camble et al. |
| 2003/0126360 | A1 | 7/2003 | Camble et al. |
| 2003/0126395 | A1 | 7/2003 | Camble et al. |
| 2003/0126396 | A1 | 7/2003 | Camble et al. |
| 2003/0126460 | A1* | 7/2003 | Camble et al. ............... 713/200 |
| 2003/0188117 | A1* | 10/2003 | Yoshino et al. ............... 711/164 |
| 2003/0188153 | A1* | 10/2003 | Demoff et al. ................ 713/153 |
| 2003/0229689 | A1* | 12/2003 | Raghavan et al. ............ 709/223 |
| 2004/0054866 | A1* | 3/2004 | Blumenau et al. ............ 711/202 |
| 2004/0153642 | A1 | 8/2004 | Plotkin et al. |
| 2004/0158711 | A1* | 8/2004 | Zimmer ........................ 713/165 |
| 2005/0007692 | A1* | 1/2005 | Thompson et al. ............. 360/93 |
| 2005/0080992 | A1* | 4/2005 | Massey et al. ................ 711/114 |
| 2005/0220305 | A1* | 10/2005 | Fujimoto et al. .............. 380/255 |
| 2006/0026263 | A1* | 2/2006 | Raghavan et al. ............ 709/217 |
| 2006/0053308 | A1* | 3/2006 | Zimmerman ................. 713/193 |
| 2006/0242066 | A1* | 10/2006 | Jogand-Coulomb et al. ... 705/50 |
| 2006/0259816 | A1* | 11/2006 | Rector et al. ................... 714/14 |
| 2007/0260891 | A1* | 11/2007 | Starr et al. .................... 713/193 |
| 2008/0183934 | A1* | 7/2008 | Starr et al. .................... 710/303 |

OTHER PUBLICATIONS

Implementation of a Campus-wide Distributed Mass Storage Service: The Dream vs. Reality, Armstead et al, IEEE, 1995.*

* cited by examiner

OPTIONAL DATA ENCRYPTION BY PARTITION FOR A PARTITIONABLE DATA STORAGE LIBRARY

CROSS-REFERENCE TO RELATED APPLICATIONS

None.

FIELD OF THE INVENTION

The present invention relates generally to storing encrypted data along with a message authentication code and moniker associated with a decryption key on a mobile medium adapted for use in a data storage library.

BACKGROUND

The data storage industry is experiencing a boom fueled in part by aggressive cost reduction of data storage due to advances in storage technology, broadened international accessibility to the internet and the World Wide Web, and the public's appetite to accumulate data. Unfortunately, with the boom has come associated undesirable activities, such as data attacks and data theft. Data stored in data storage libraries are among the primary targets of such attacks and theft.

Data storage libraries serve as data receptacles for a variety of clients, including businesses, governments, and the general population. These libraries are generally comprised of drive storage devices adapted to read and write data to and from media which can be archived within the libraries. Traditionally, tape media has been used in many of the mainstream storage libraries due to the relatively high storage capacity and data integrity robustness of tapes. One advantage of tape is mobility, providing achievability in remote locations called "vaults", making an 'on-line' data attack difficult, if not impossible. However, should an attacker acquire a tape, the data stored on the tape may be subject to unwanted access. In attempts to prevent unwanted access, the tape, or other mobile media capable of being used in a data storage library, can be armed with a number of security measures including data encryption. One fundamental component of data encryption is the knowledge of how to decode or decrypt the data; such knowledge is known to those skilled in the art as the key. In order to increase security of data, decryption keys can be changed from one data set to another frequently enough to instill sufficient confidence that the encrypted data is secure.

Dealing with numerous keys associated with various mobile media that may be located in a variety of different locations can not only be a management challenge, it can be time consuming. Some clients using a data storage library may consider data encryption as a required feature to protect their data, while other clients may prefer to forgo encryption protection in the interest of conserving resources and time associated with key management. Also, managing the encryption requirements of different clients on in a commonly used data storage library can be complex and problematic.

In an effort to manage differing encryption of stored data on mobile media (within a library or vault, for example) for multiple clients using a common library, both methods and apparatus are disclosed herein. It is to innovations related to this subject matter that the claimed invention is generally directed.

SUMMARY OF THE INVENTION

The present invention relates generally to storing encrypted data on a mobile storage medium described for use with a storage library and overcomes the disadvantages and limitations of the prior art by providing a method and apparatus for storing the encrypted data along with a moniker associated with a decryption key and message authentication code.

Embodiment of the present invention can therefore comprise a data storage library comprising: a first and second drive; a first and second mobile medium; a first and second partition wherein the first partition comprises the first drive and the first mobile medium and the second partition comprises the second drive and the second mobile medium; a combination bridge controller device configurable to control first communication traffic between at least a first client and the first partition wherein the first communication traffic can comprise a first data package; and the combination bridge controller device further configurable to optionally encrypt the first data package for storage on the first mobile medium when the first mobile medium is in cooperation with the first drive.

Another embodiment of the present invention can further comprise a data storage library capable of performing method steps of: configuring a combination bridge controller device to partition the library into at least a first and second partition wherein each of the partitions comprise at least one drive and one mobile storage medium substantially comprised within the library; configuring the combination bridge controller device to encrypt data intended for storage in a first partition; receiving a first data package from a client intended for a first of at least two partitions; encrypting the first data package; directing the first encrypted data package to the first partition for storage on a first mobile media.

Yet another embodiment of the present invention can further comprise a data storage library comprising: a plurality of drives each adapted to store data on one of a plurality of mobile media capable of being comprised by the library; the library adapted to be divided into at least a first and second partition wherein the first and second partitions each comprise at least one of the plurality of drives; a user interface linked to a combination bridge controller device wherein the user interface can configure the combination bridge controller device to control communication traffic between a client and the first or second partition; the combination bridge controller device capable of being configured via the user interface to encrypt first user data intended for the first partition as received by the client; the combination bridge controller device capable of transmitting the encrypted first data for storage on one of the mobile media comprised by the first partition.

Yet another embodiment of the present invention can further comprise a data storage library comprising: a combination bridge controller configurable to divide the library into a first partition comprising at least a first drive and at least a first mobile medium and a second partition comprising at least a second drive and at least a second mobile medium and to encrypt and transmit first data received for storage in the first partition and transmit as received data for storage in the second partition.

Yet another embodiment of the present invention can further comprise a method of storing encrypted data on a mobile medium of a data storage library comprising the steps of: logically dividing the data storage library into at least a first and second partition; designating the first partition as capable of storing the encrypted data on the mobile medium; generating at least one of a unique encryption key and a message authentication code associated with the encrypted data; and storing the encrypted data the message authentication code on the mobile medium in the first partition.

DETAILED DESCRIPTION

Figure 1:
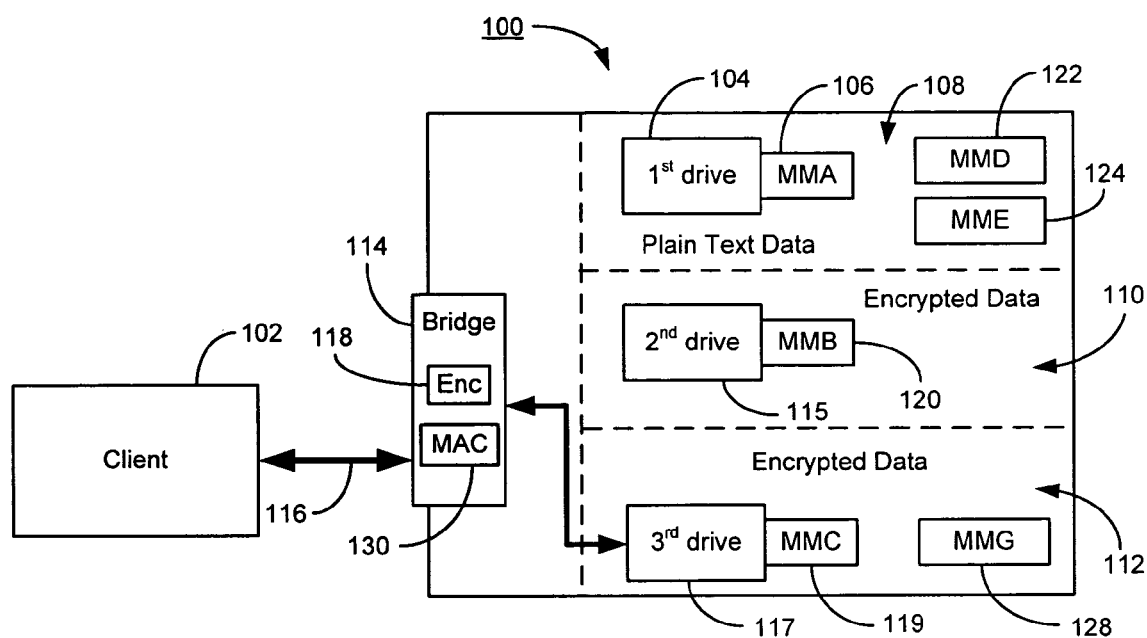
FIG. 1 is a block diagram of a data storage arrangement constructed in accordance with an embodiment of the present invention.

Referring to the drawings in general, and more specifically to FIG. 1, shown therein is a block diagram of a data storage arrangement constructed in accordance with an embodiment of the present invention. In what follows, similar or identical structure is identified using identical callouts.

The data storage arrangement illustrated in FIG. 1 can comprise a client 102 in communication 116 with a data storage library 100. The client 102 can be a host computer or some other consumer/producer of data; other embodiments can also include another storage library or a streaming output device, such as a video server, to name several examples. The client 102 is an entity, or entities, that is capable of 'taking in' data, for example a client 102 is a consumer when receiving data and a storage library 100 is a consumer when receiving data. As one skilled in the art will appreciate, in addition to 'taking in' data, a consumer of data is also generally capable of manipulating and/or transmitting data. The client 102 can be a personal computer, a main frame computer, a server, or any computer system operatively linked to the storage library 100, to name a few examples. The communication path 116, at a minimum, needs only to facilitate communication between the client 102 and the storage library 100. The means for communication can be accomplished by a dedicated pathway (such as a SCSI [Small Computer Systems Interface] cabled connection), fiber-channel or, in an alternative embodiment, a pathway over a network (such as a LAN, WAN, or other communication architecture), for example. Furthermore, the communication path can be in the form of a wire line pathway, wireless, or a combination thereof.

The library 100 illustratively comprises a combination bridge controller device 114 capable of making compatible the communication traffic between, for example, a first drive 104 the client 102. Thus, for example, the client 102 may be in communication 116 with the library 100 via fiber-channel using a fiber-channel protocol; however, the drives 104, 115 and 117 comprised by the library 100 may be configured to communicate via a SCSI-channel using a SCSI protocol. The combination bridge controller device 114 bridges (i.e., makes compatible) the communication differences between the client 102 and the components within the library 100, such as the first drive 104. As illustratively shown, the library 100 is divided into a first, second and third partition 108, 110 and 112, respectively. The combination bridge controller device 114 can be adjustably configured to encrypt data for storage for in a particular partition, such as the second and third partitions 110 and 112 shown herein. Each partition in the library 100 illustratively comprises at least one drive and one mobile medium, such as the first partition 108 comprising the first drive 104 and mobile media 'A' 106, 'D' 122 and 'E' 124. As illustratively shown, the second partition 110 comprises one mobile medium 'B' 120 which is in cooperation with the second drive 115 and the third partition 112 comprises two mobile media 'C' 119 and 'G' 128, wherein mobile media 'C' 119 is in cooperation with the third drive 117. In one embodiment, the three partitions 108, 110 and 112 can be of equal size. In another alternative embodiment the three partitions 108, 110 and 112 can be combined to comprise the total storage capacity and resources of the library 100. The partitions 108, 110 and 112 can be dedicated to the same client, such as client 102, to different clients, or a combination thereof. As one skilled in the art will appreciate, a library, such as the library 100, can be configured with numerous partitioning layouts and schemes. Configuring a partition can be done, for example, by the client 102 or by an operator sending commands from a graphical user interface (shown in connection with FIG. 2), to name two options.

The combination bridge controller 114 is adapted to direct storage related communications, i.e. a data package to a drive, such as the third drive 117 cooperating with mobile media 'C' 119 as shown herein. A data package is considered a discrete article of data, such as for example a file, a group of data received in a substantially contiguous time interval, data that is linked (i.e. a folder), or data that is of a predetermined size, to name several examples. The mobile media comprised by the library 100 can optionally be moved within or outside of the library 100 and can be used with other compatible drive devices.

The combination bridge controller device 114 can comprise an encryption engine 118 capable of encrypting at least a data package received over communication path 116 by the client 102. Embodiments of the encryption engine 118 can include software programs used with a processor, or alternatively, a chip comprising encryption capability, to name two non-limiting examples. The encryption engine 118 need only be capable of altering data from plain text, or in some cases data 'as received' from the client 102, to a form requiring a key to decipher, or bring back the data to the 'as received' state. An 'as received' state could be in a form other than plain text, such as a data package previously encrypted or compressed by the client 102, for example.

In addition to the encrypted data, the combination bridge controller device 114 can also be optionally capable of transmitting a moniker, or nickname, associated with the key and a MAC (Message Authentication Code) generated by a MAC engine 130 for storage on a mobile medium, such as mobile medium 'A' 106, when in cooperation with a drive, such as the first drive 104. In one embodiment of the present invention the moniker can optionally be encrypted. The MAC provides a way to check the integrity of information transmitted over or stored in an unreliable medium (i.e. mobile medium that is subject to tampering or simple data degradation due to adverse environmental conditions for data retention, to name a couple examples). A MAC is an authentication tag (also called a 'checksum') derived by applying an authentication scheme, together with a secret key, to a message. Unlike digital signatures, MACs are computed and verified with the same key, typically to be verified by the intended recipient. Different types of MACs include: unconditionally secure based MACs, hash function-based MACs (HMACs), stream cipher-based MACs and block cipher-based MACs, to name four exemplary options. The MAC and moniker, in one embodiment, can be stored in a memory allocated space on a mobile storage medium. Upon decryption of the stored encrypted data, the moniker can be used to identify the key enabling the encryption engine 118 to decrypt the encrypted data package. In one embodiment, the moniker can be a plain text 'name' for the key, for example, the moniker 'SALLY' is the code name for the key '1ks39J0$A' wherein 'SALLY' is stored on the media and cannot intrinsically decrypt the encrypted data; only the key can decrypt the encrypted data. In one embodiment, the library 100 may be the only entity that has knowledge of both the key and moniker, hence a library or drive other than the library 100 that stored encrypted data on the media will fail in attempts to decrypt the media, unless it too has or obtains knowledge of the encryption key relative to the moniker. In an alternative embodiment, the moniker and key are uniquely known by the client 102, and attempts from another source to decrypt the encrypted data will fail. In yet another alternative embodiment, knowledge of the key and moniker may be in two or more locations, such as the client 102 and the library 100, for redundancy to ensure against the loss of the key in one of the locations for example. The MAC can be used to guarantee that the decrypted data package has been unaltered from the data package prior to encryption upon processing the MAC through the MAC engine 120. Authenticating that the decrypted data package is complete and without change demonstrates or confirms that the decryption process was successfully accomplished and the data was not altered in any way.

Figure 2:
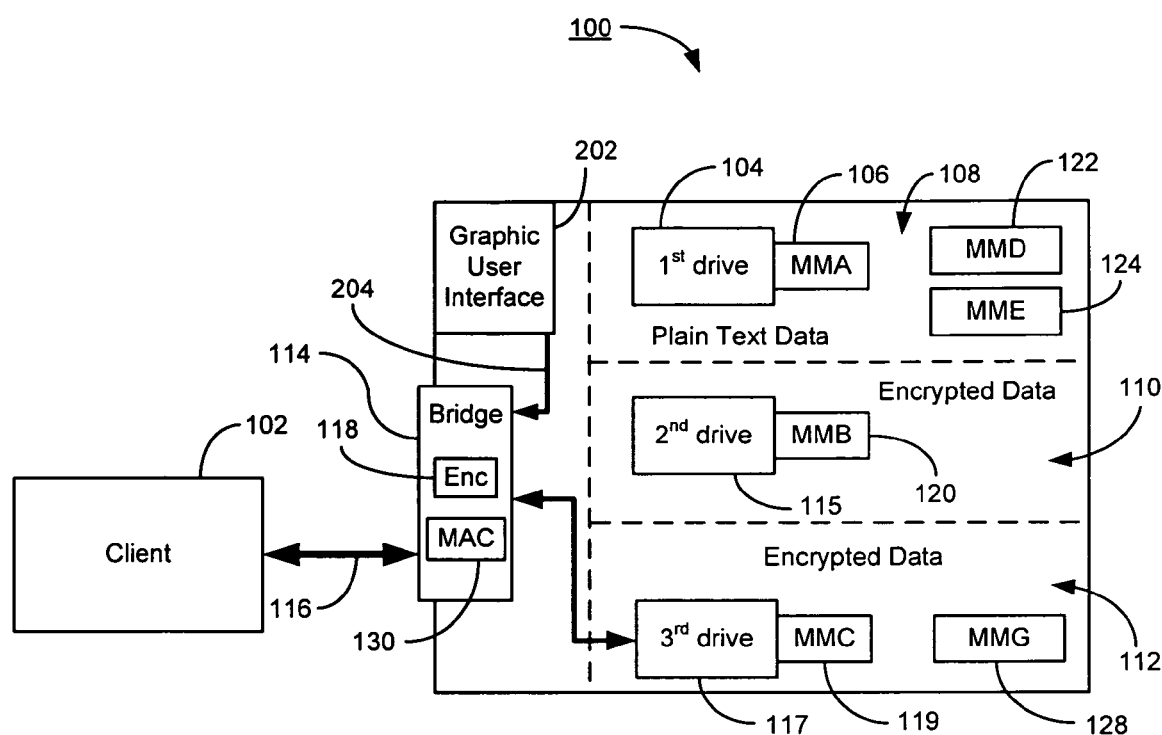
FIG. 2 shows an alternative embodiment of the present invention showing a combination bridge controller device directing storage traffic to a specific partition.

FIG. 2 shows an alternative embodiment of the present invention wherein the combination bridge controller device 114 is configurable via a graphic user interface 202. The graphic user interface 202 is illustratively shown here connected to the combination bridge controller device 114 by a Component Area Network (CAN) connection 204, though any suitable connection could be used. A partition, such as the third partition 112, may be configured by the client 102 or by an operator sending commands from the graphical user interface 202, to name two illustrative options. Optionally, an operator can input a moniker associated with a key by means of the graphical user interface 202. In one configuration, the graphic user interface 202 can be linked with other memory capable of storing knowledge of a moniker associated with a key comprised by the library 100. Optionally, the client 102 can have knowledge of the moniker and key, and thus provide the library 200 the moniker and key upon a request to retrieve data. In yet another embodiment, knowledge of the moniker can reside in the CAN 204. As described in FIG. 1, a data package received over communication path 116 from the client 102 can be encrypted by the encryption engine 118 and stored along with a MAC and moniker on a mobile storage medium in cooperation with a drive, such as when mobile media 'C' 119 cooperates with the third drive 117.

Figure 3:
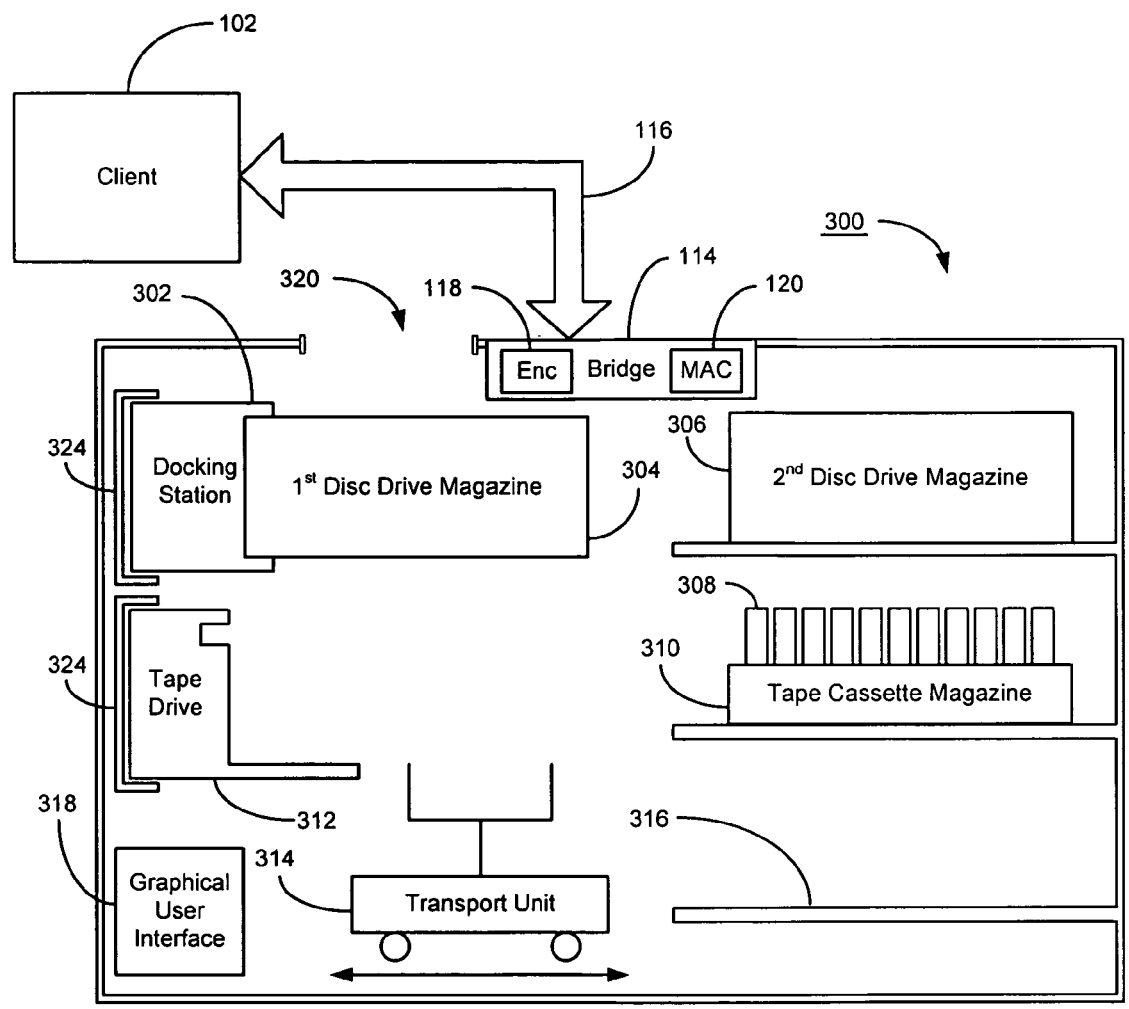
FIG. 3 is an embodiment of the present invention showing a data storage library comprising two different embodiments of mobile storage media.

FIG. 3 is an embodiment of the present invention showing a data storage library 300 comprising two different embodiments of mobile storage media 306 and 308. As illustratively shown, the client 102 is in communication with the library 300 via the communication path 116 and the combination bridge controller device 114. The library 300 comprises two embodiments of a mobile storage medium, a first and second disc dive magazine 304 and 306 (being a first medium type) and a tape cassette magazine 310 loaded with a plurality of tape cassettes 308 (being a second media type). The library 300 also comprises a docking station 302 capable of reading and writing data to and from the first and second disc drive magazines 304 and 306 and a tape drive 312 capable of reading and writing data to and from one of a plurality of tape cassettes 308 comprised by the tape cassette magazine 310. The library 300 can optionally comprise a shelving system 316 capable of archiving the mobile media 304, 306 and/or 310 within the library 300. A transport unit 314 comprises means to transport a mobile medium, such as the first disc drive magazine 304, from the shelf system 316 to a drive, in this case the docking station 302. In one embodiment, the transport unit 314 can comprise a means to load a tape cassette 308 into the tape drive 312 in a cooperating relationship to read and write data, such as a robotic picking device (not shown) for example. The library 300 also optionally comprises an entry/exit port 320 whereby mobile media can be transferred between an environment external to the library 300 and an environment internal to the library 300. The library 300 is partitionable into at least two partitions, wherein a first partition can include the docking station 324 and the first and second mobile disc drive magazines 304 and 306, and the second partition can include the populated tape cassette magazine 310 and the tape drive 324.

The library 300 is capable of being configured to enable each partition to optionally encrypt data received from the client 102 and to store the encrypted data on a mobile medium (optionally along with a moniker and MAC), illustrated herein as the first disc drive magazine 304 that is in cooperation with the docking station 302. In one embodiment, a graphical user interface 318 is capable of transmitting the moniker associated with a key required to decrypt the encrypted data as inputted by an operator. The key can be randomly generated from a pool of numbers, letters and symbols, for example, and the moniker can be assigned to the key by an operator, for example. In one exemplary scenario, a mobile medium, such as the first disc drive magazine 304, comprising encrypted data, a moniker and MAC associated with the encrypted data is capable of being removed from the library 300 via the entry/exit port 320 and disposed in an archive location, such as a room remote from the library 300. In an embodiment where the library 300 is the only entity with knowledge of the decryption key and the moniker, the encrypted data cannot be readily decrypted unless by the library 300. The moniker can enable the library to quickly make a determination of which key to use to decrypt. The key can be provided by the library 300 with knowledge of the moniker, to, for example, a user or a second authorized library or device capable of reading data from the mobile medium. In yet another embodiment, the mobile medium can additionally have an identification means associating it with the specific library on which the data was stored. An example of an identification means can be a library identification stored along with the moniker and MAC in a memory allocated space, a serial number, a barcode, or some alternative identifying means.

In an embodiment consistent with FIG. 3, the disc drive magazines 304 and 306 and tape cassette magazine 310 have substantially identical footprints to facilitate commonality for transporting within the data storage library 300 by the transport unit 314. An identifier, such as a bar code for example, can be associated with each disc drive magazine 304 or 306 or tape cassette magazine 310 and can be used to identify a disc drive magazine 304 or 306 or tape cassette magazine 310 if archived in a remote location for example, such as the archive vault for example.

In another embodiment of the present invention, the docking station 302 is dimensionally substantially identical to a full height LTO, SAIT or DLT tape cassette drive. Consequently, either an additional tape drive or docking station is capable of being interchangeably mounted in one of a plurality of drive bay assemblies 324, allowing the data storage library 300 an additional degree of flexibility.

Figure 4:
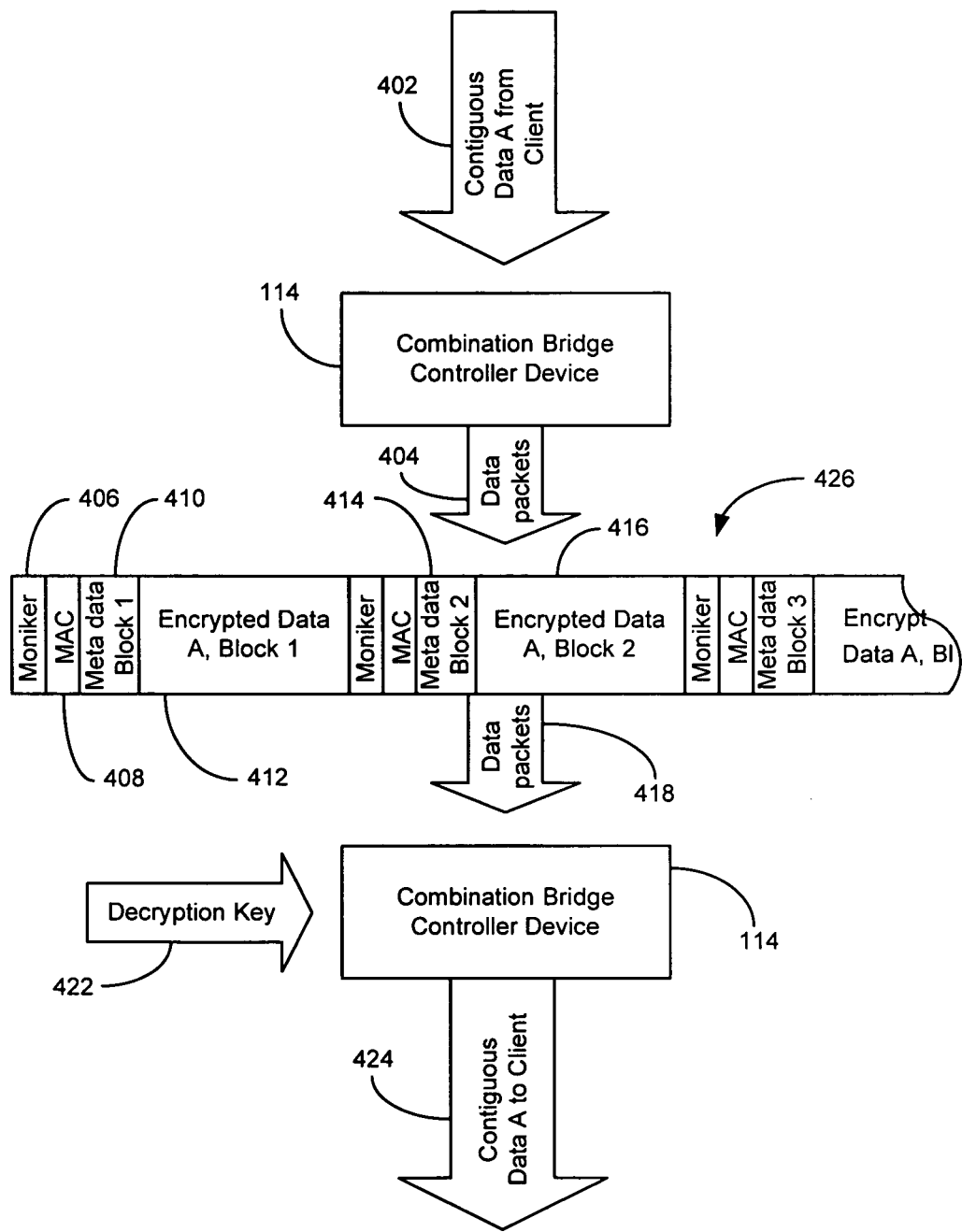
FIG. 4 is a block diagram consistent with an embodiment of the present invention showing streamed data packets stored on mobile media in a tape/streaming protocol.

FIG. 4 is a block diagram consistent with an embodiment of the present invention showing streamed data packets stored on mobile media 426 in a tape/streaming protocol. The combination bridge controller device 114 is adapted to receive, in the illustration, contiguous data 'A' 402 from a client, such as the client 102. Upon being configured to encrypt, the combination bridge controller device 114 is capable of converting contiguous data 'A' 402 into discrete encrypted data packets 404 that are sent to a mobile storage medium 426 when cooperating with a drive capable of storing the data packets 404. Herein, the mobile storage medium 426 includes a moniker 406 associated with a decryption key 422 that is at least specific to the stored encrypted data 404. The decryption key 422 and associated moniker 406 can be different for each data package, fractions of data packages, numbers of data packages, or time when data packages are received and/or stored, to name several options. In addition to the moniker 406, a MAC 408 can be stored on the medium 426. The moniker 406 and MAC 408 can optionally be stored in dedicated memory allocated space on, or associated with, the mobile storage medium 426, such as at the beginning of each encrypted data block 412 and 416 as illustrated here. As illustratively shown, the storage medium 426 comprises a sequence of encrypted data blocks, such as encrypted data 'A' block 1 412, encrypted data 'A' block 2 416 and so on. Meta data, such as meta data block 1 410, can be associated with each data block, such as encrypted data 'A' block 1 412. By having the moniker 406 and MAC 408 associated with each block, the information can be used readily in the event a drive commences reading data on an ensuing block relative to block 1 412, i.e., block 2 416. One of ordinary skill will appreciate that the MAC 408 and the moniker 406 can be located in different arrangements, including at the beginning of the stored data package, i.e. block 1 412, or arranged such that the moniker 406 is in one location and the MAC 408 is at the beginning of each block 412 and 416, for example, without departing from the scope and spirit of the present invention.

Upon decrypting the encrypted data 'A' stored on the medium 426, the moniker 406 is matched with the associated decryption key 422. Knowledge of the moniker 406 and the decryption key 422 can be in the combination bridge controller device 114, a different memory device within the library, such as library 100, or an alternative location, such as the client, or a combination therein, for example. Once the data packets 418 are decrypted, the MAC 408 can be used to validate the authenticity and integrity of the decrypted data (validating that the data is the same when decrypted as it was prior to encryption). In this embodiment, the combination bridge controller device 114 is also capable of assembling the decrypted data packets, such as the packets of block 1 412 and block 2 416, without the meta data, such as the associated meta data for block 1 410 and meta data for block 2 414, back to the original contiguous form 424 for transmission to the client 102 for example. In an alternative embodiment, the data can be stored as a contiguous data package without blocks with meta data as shown in FIG. 4.

Figure 5A:
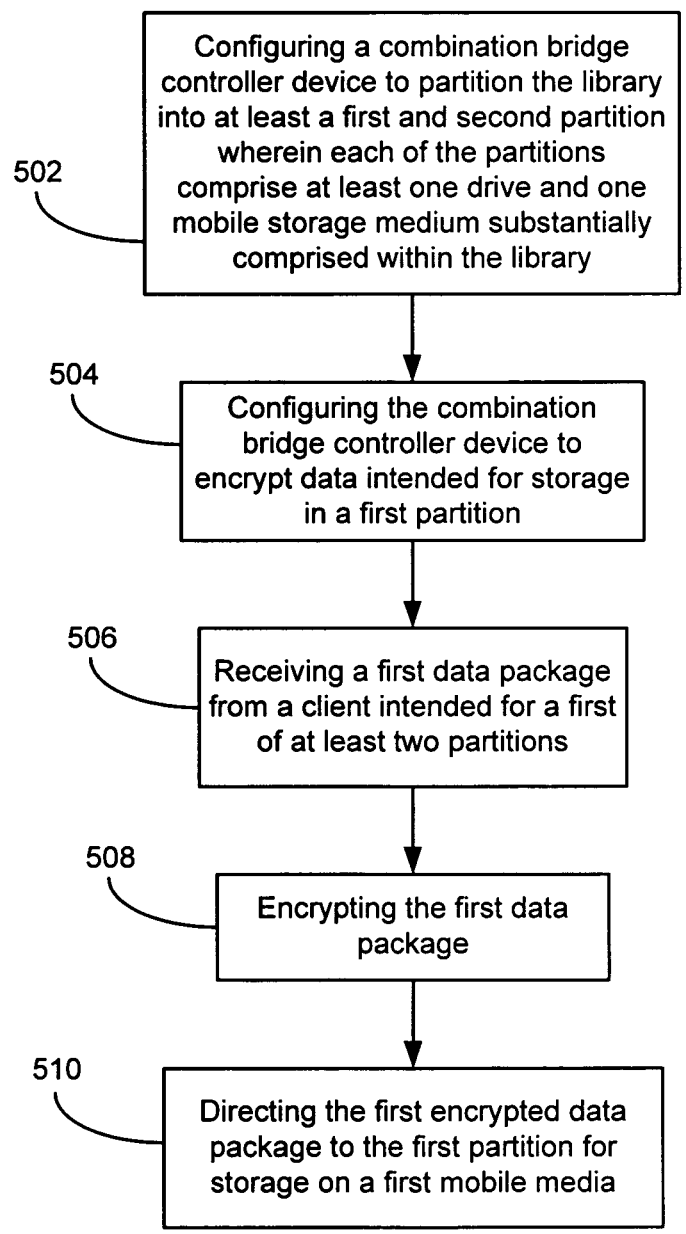
FIGS. 5A and 5B are block diagrams showing some methods wherein some embodiments of the present invention can be practiced.

Referring now to FIG. 5A in conjunction with FIG. 1, shown therein is a method to practice an embodiment of the present invention. It should be recognized that the steps presented in the described embodiments of the present invention do not necessarily require any particular sequence. As shown in step 502, a combination bridge controller device 114 is configured to partition a library into at least a first partition 108, a second partition 110 and, as shown in FIG. 1, a third partition 112. Each partition 108, 110 and 112 comprises at least one drive and one mobile storage medium substantially comprised within the library, such as the first, second and third drive 104, 114 and 116 and associated mobile media 106, 122, 124, 120, 119 and 128 respectively as shown in FIG. 1. As shown in step 504, the combination bridge controller device 114 is configured to at least encrypt data intended for storage in the second and third partitions 110 and 112. As shown in step 506, the data storage library 100 is capable of receiving over the communication path 116 a data package from a client 102. As one skilled in the art will appreciate, there can be multiple clients interacting with multiple partitions comprised by the library 100 wherein the library 100 is capable of receiving a plurality of data packages potentially at substantially the same time. As shown in step 508, the data storage library 100 is capable of encrypting the data package intended for the partition configured to store encrypted data. Means for encryption can be accomplished with an encryption engine 118, such as a large scale integration chip(s) or an algorithm capable of encryption operating through a central processing unit, to name two examples. As shown in step 510, the data storage library 100 is capable of directing the encrypted data package to a drive in the appropriate partition, such as the first drive 104 comprised by the first partition 108 of the library 100. Means for directing the encrypted data package to a drive can be accomplished by a controller such as the combination bridge controller device 114 over a channel, such as a SCSI channel, connecting the two 114 and 104. In one embodiment, the data storage library 100 is capable of storing the encrypted data package, a message authentication code 408 and a moniker 406 (as described in connection with FIG. 4), on a mobile storage medium, such as mobile media 'A' 106, when cooperating with the drive, such as the first drive 104.

Figure 5B:
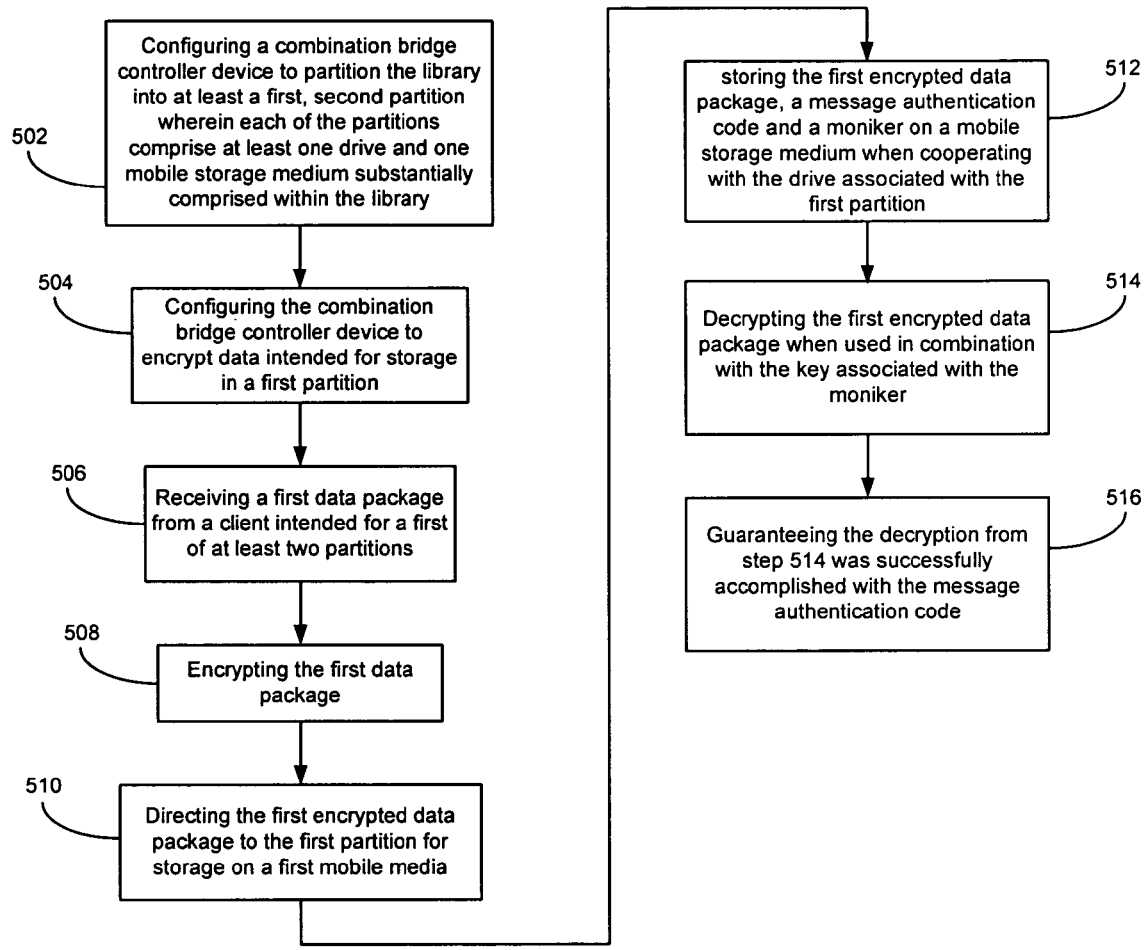

Referring to FIG. 5B in conjunction with FIGS. 1 and 4, shown therein is an alternative method consistent with some embodiments of the present invention which includes method steps 502-510 from FIG. 5A. As shown in step 512, the data storage library 100 is capable of storing the encrypted data package, along with a message authentication code 408 and a moniker 406, from FIG. 4, on a mobile storage medium, such as mobile media 'C' 119, when cooperating with the drive, such as the third drive 117, associated with the appropriate partition, such as the third partition 112. As shown in step 512, the data storage library 100 is capable of decrypting the first encrypted data package 418 when used in combination with the key 422 associated with the moniker 406. Means for decrypting the encrypted data package 418 can be accomplished by an encryption/decryption chip (not shown) comprised by the combination bridge controller device 114. The key 422 required for decryption can be identified via the moniker 406 and can be known by the library 100, or optionally, in a second location or a combination thereof. As shown in step 512, the data storage library 100 is capable of guaranteeing the decrypted data package was successfully accomplished with confirmation of the message authentication code 408. Means for guaranteeing successful decryption can be accomplished by a MAC engine, such as the MAC engine 120, which in one embodiment can be combined with the encryption/decryption chip.

Figure 6A:
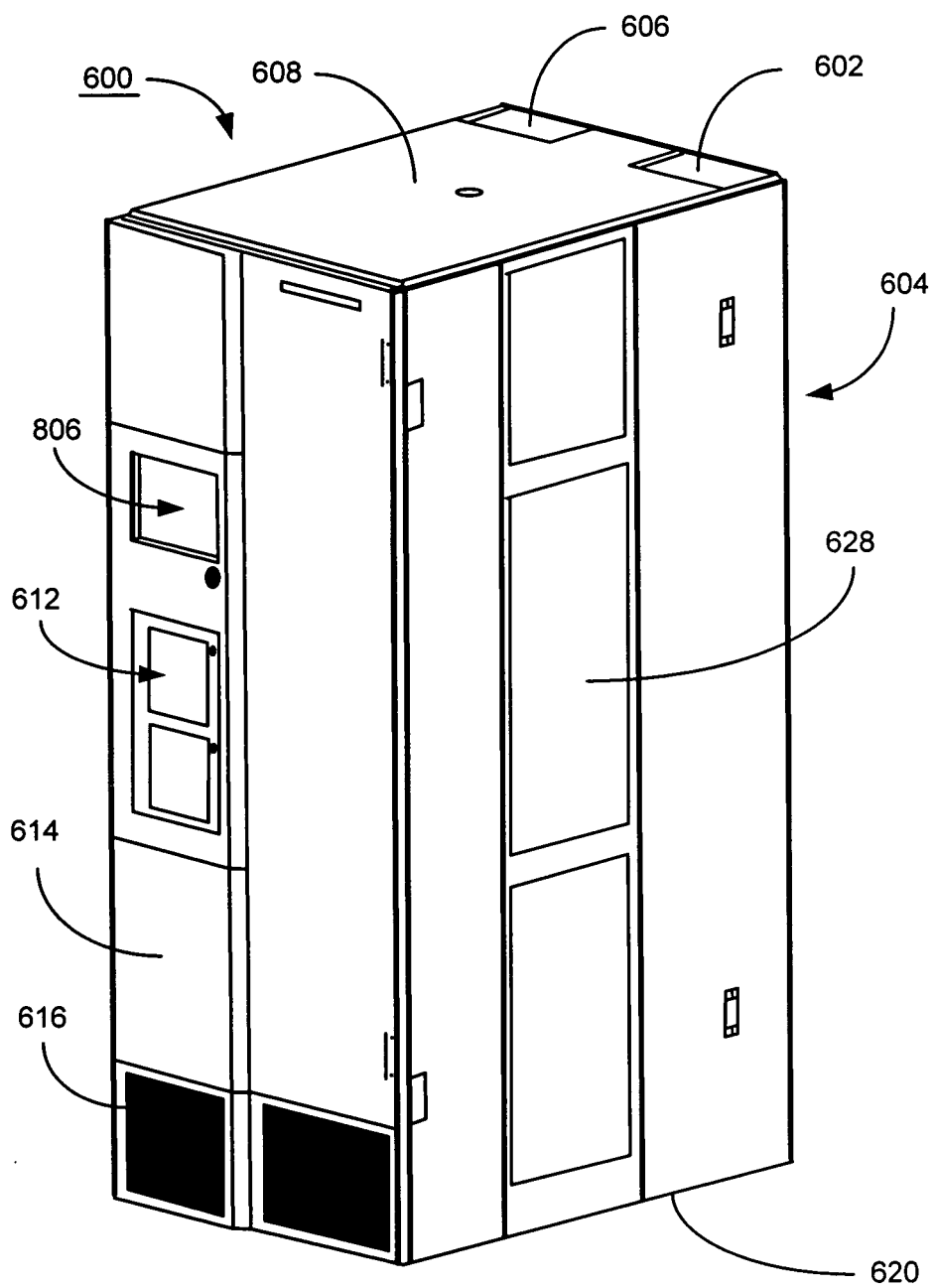
FIGS. 6A-6E show different views and cross sections of a Spectra Logic T950 storage library in which some embodiments of the present invention can be practiced.
Figure 6B:
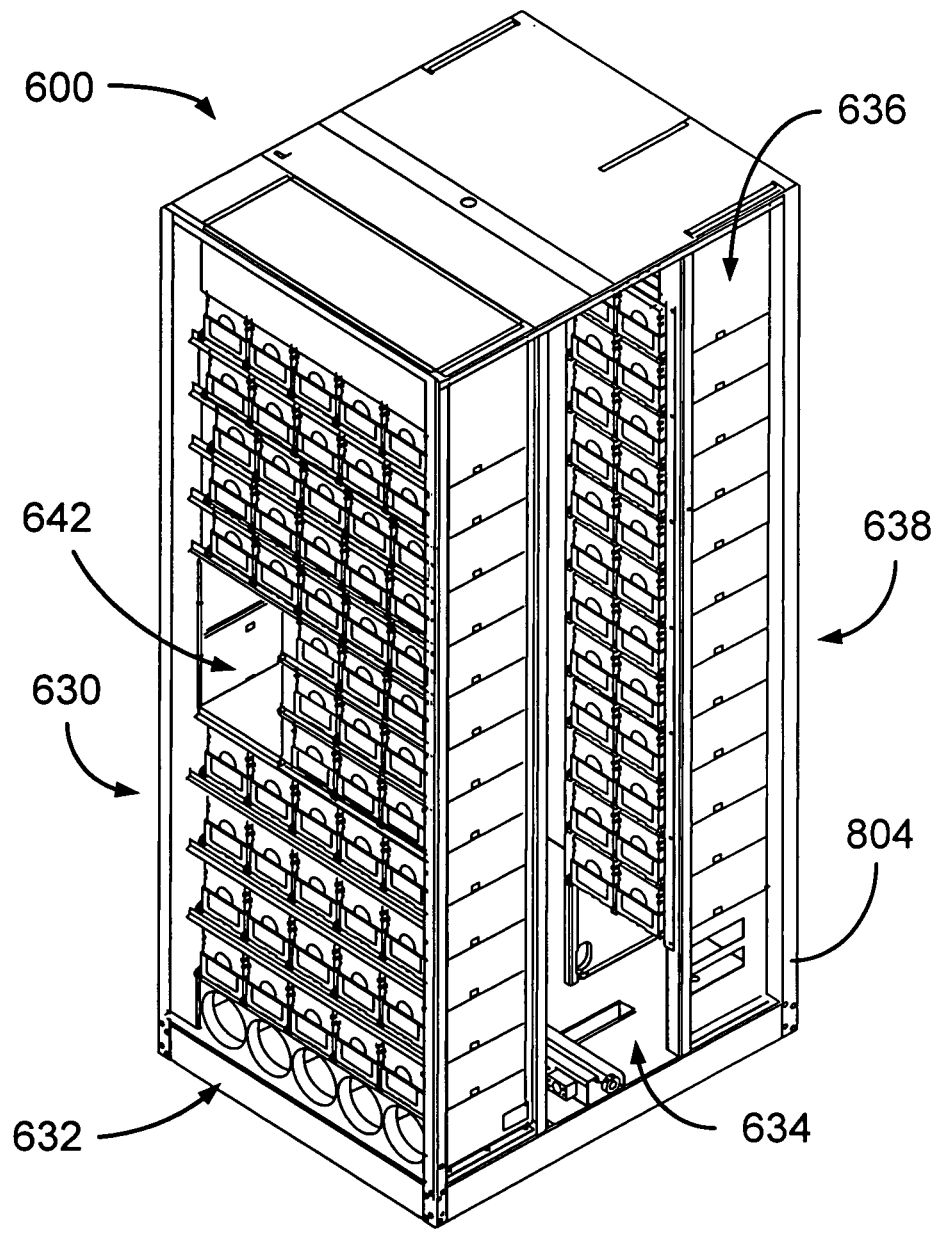
Figure 6C:
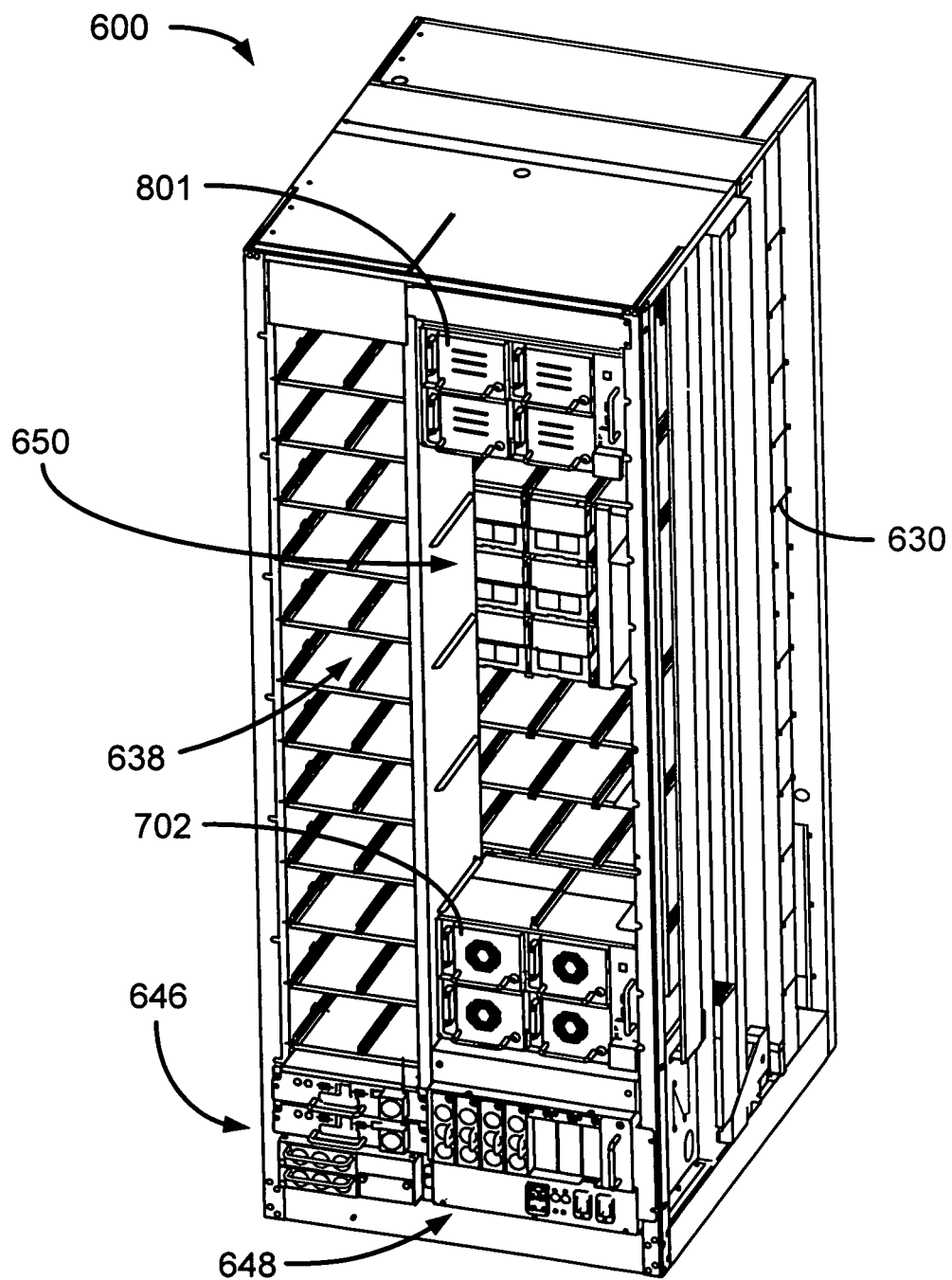
Figure 6D:
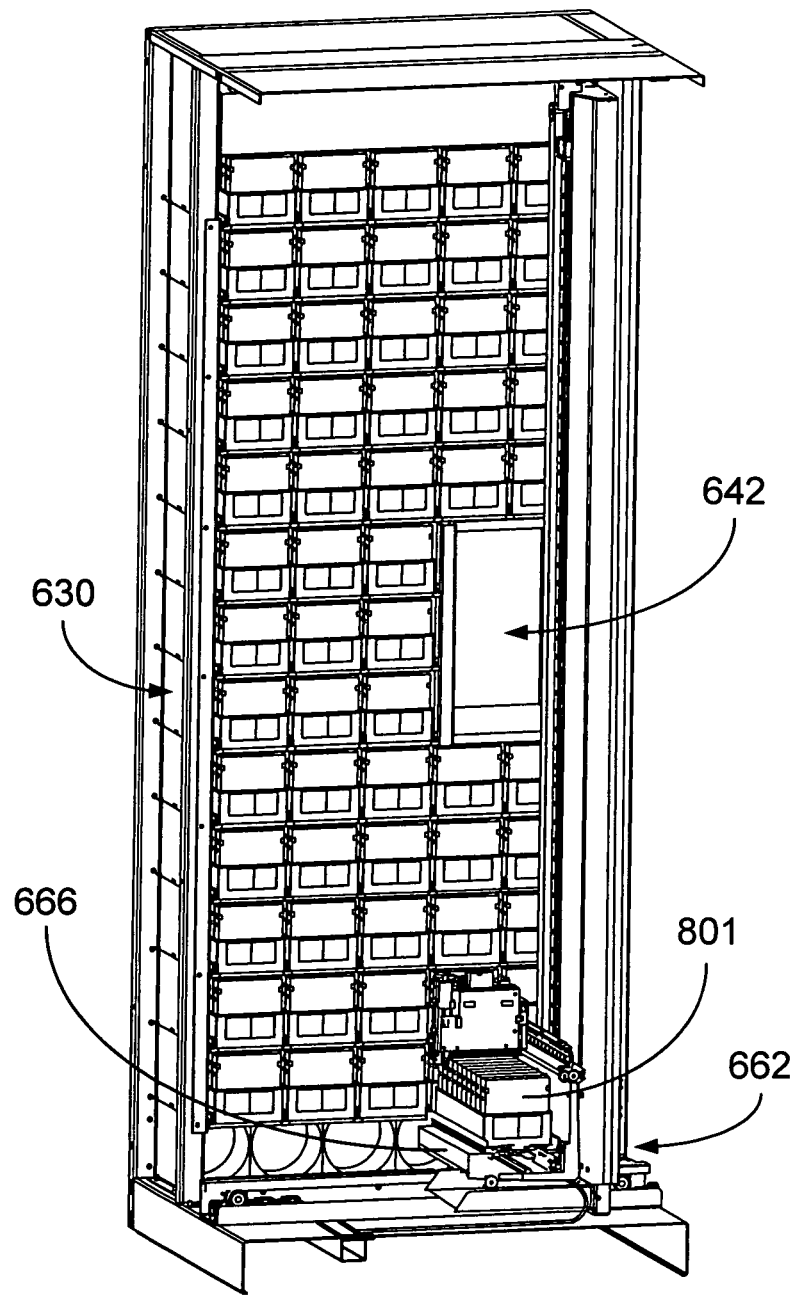
Figure 6E:
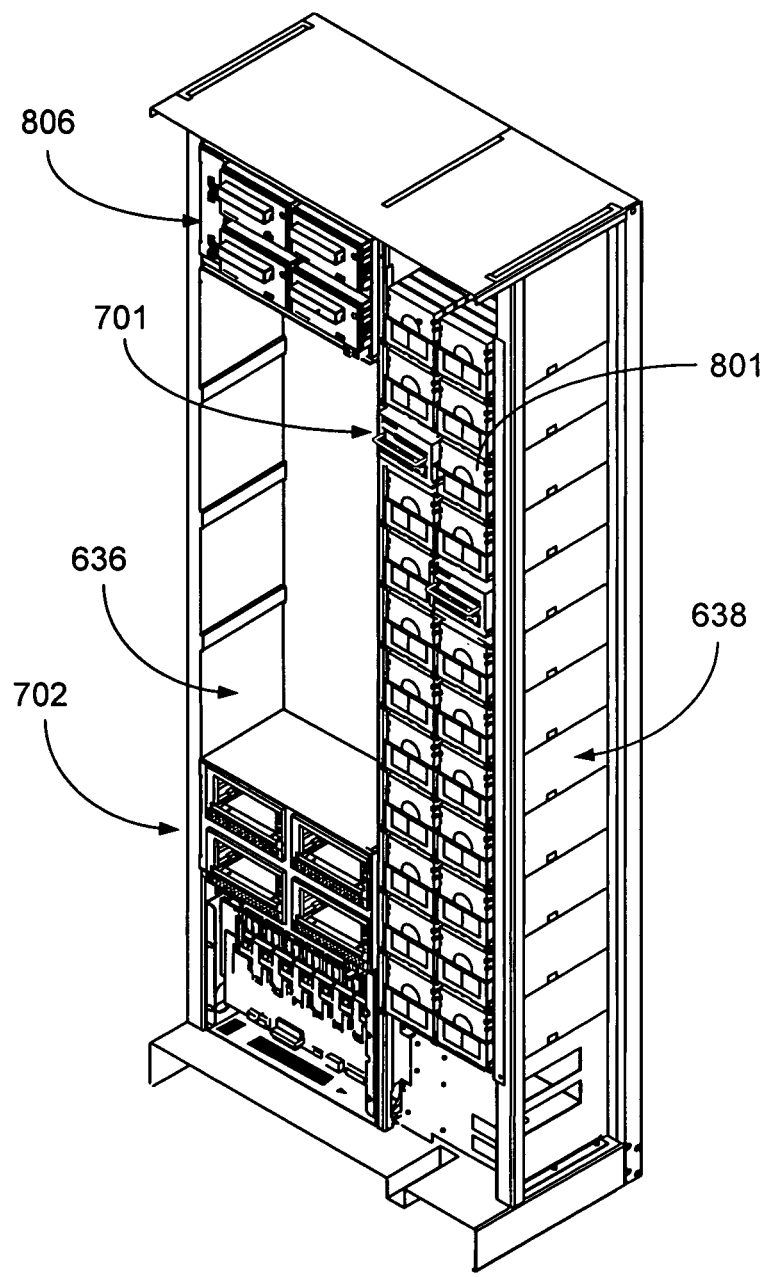
Figure 7:
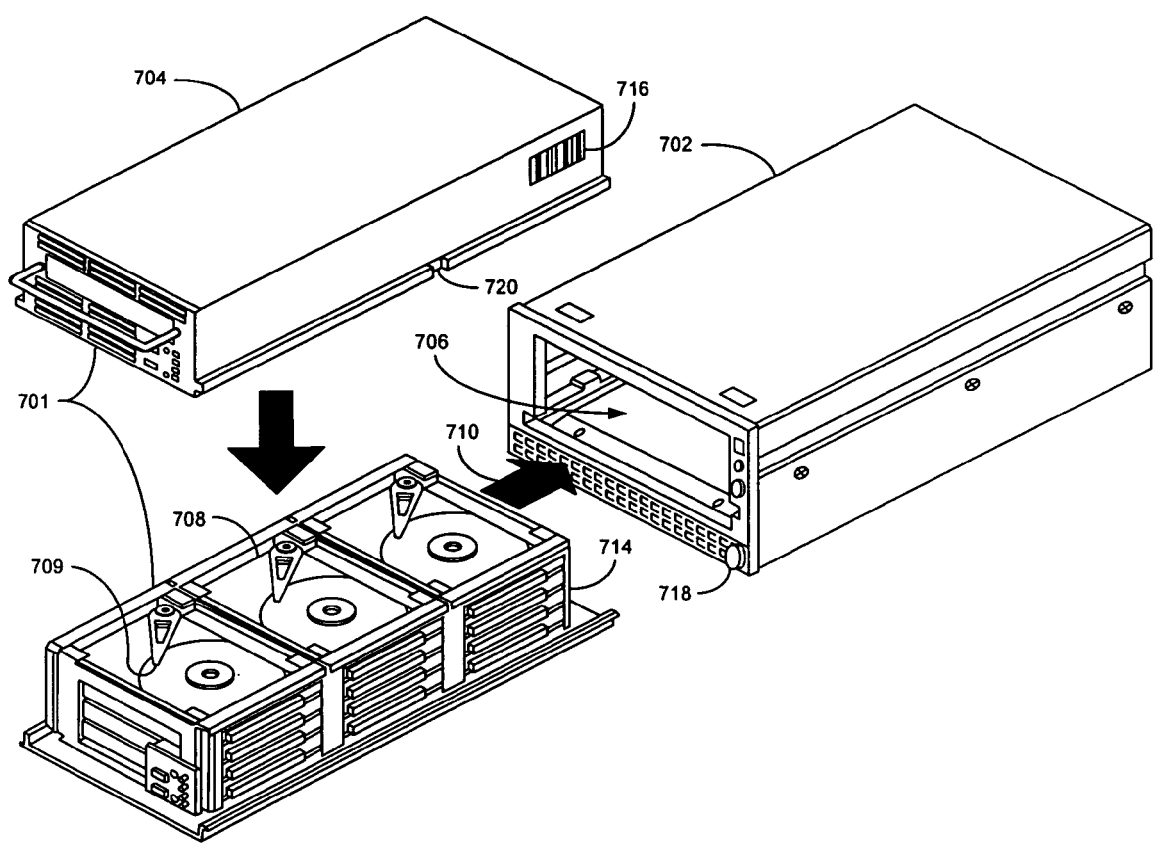
FIG. 7 shows a disc drive magazine and docking station consistent with some embodiments of the present invention.

Embodiments of the present invention can be commercially practiced, for example, in connection with a Spectra Logic T950 data storage library 600, sold by Spectra Logic Corporation of Boulder, Colo., and components associated with the T950 library 600 as shown in FIGS. 6A-8B. The T950 library 600 is capable of comprising both disc drive magazines 701, as shown in FIG. 7, and a plurality of tape cassettes 802 that are disposed in a tape cassette magazine 800, shown in FIG. 8A. The T950 library 600 is capable of comprising a plurality of tape cassette magazines 800. A tape cassette 802 and a disc drive magazine 701 are embodiments of a mobile storage medium.

In more detail, FIG. 7 shows an embodiment of a disc drive magazine 701 and docking station 702 consistent with some embodiments of the present invention. More specifically, shown herein is an RXT disc drive magazine and RXT docking station from Spectra Logic Corporation. As illustratively shown, a plurality of disc drives 708 are substantially encased by an enclosure 704 (four walls a top and a bottom) generally comprising the mobile disc drive magazine 701. Disposed on the enclosure is an optional bar code identifier 716 adapted to identify the disc drive magazine 701, which has utility should the disc drive magazine 701 be archived in a media pack storage vault, for example. A conventional magnetic disc drive 708 is only one embodiment of a random access storage device capable of being used in a mobile random access memory magazine such as the disc drive magazine 701 according to the present invention, which, in further embodiments, can include flash memory and optical memory, to name a few. The mobile disc drive magazine 701 is adapted to be received by an opening 706 in the docking station 702 as shown by the arrow 710. In one embodiment, a loading device (not shown) is disposed in the docking station 702 and is adapted to automatically pull the mobile disc drive magazine 701 to engage the magazine 701 with the docking station 702 in electrical contact establishing a communication link. When the mobile disc drive magazine 701 is operatively linked in a cooperating relationship with the docking station 702, both power and transmission of data can occur between the docking station 702 and the mobile disc drive magazine 701. The docking station 702 is shown to be capable of being electrically connected with a host computer, such as the client 102, or other storage device(s), such as another data storage library for example, by a coupling means, such as wires, plugs-in, wireless transmission (e.g., IR, RF), or any combination or equivalence thereof. In one embodiment, by linking the docking station 702 with the data storage library 600, a mobile disc drive magazine 701 is effectively in a cooperatively linked state with the other storage devices comprised by the storage library 600.

Figure 8A:
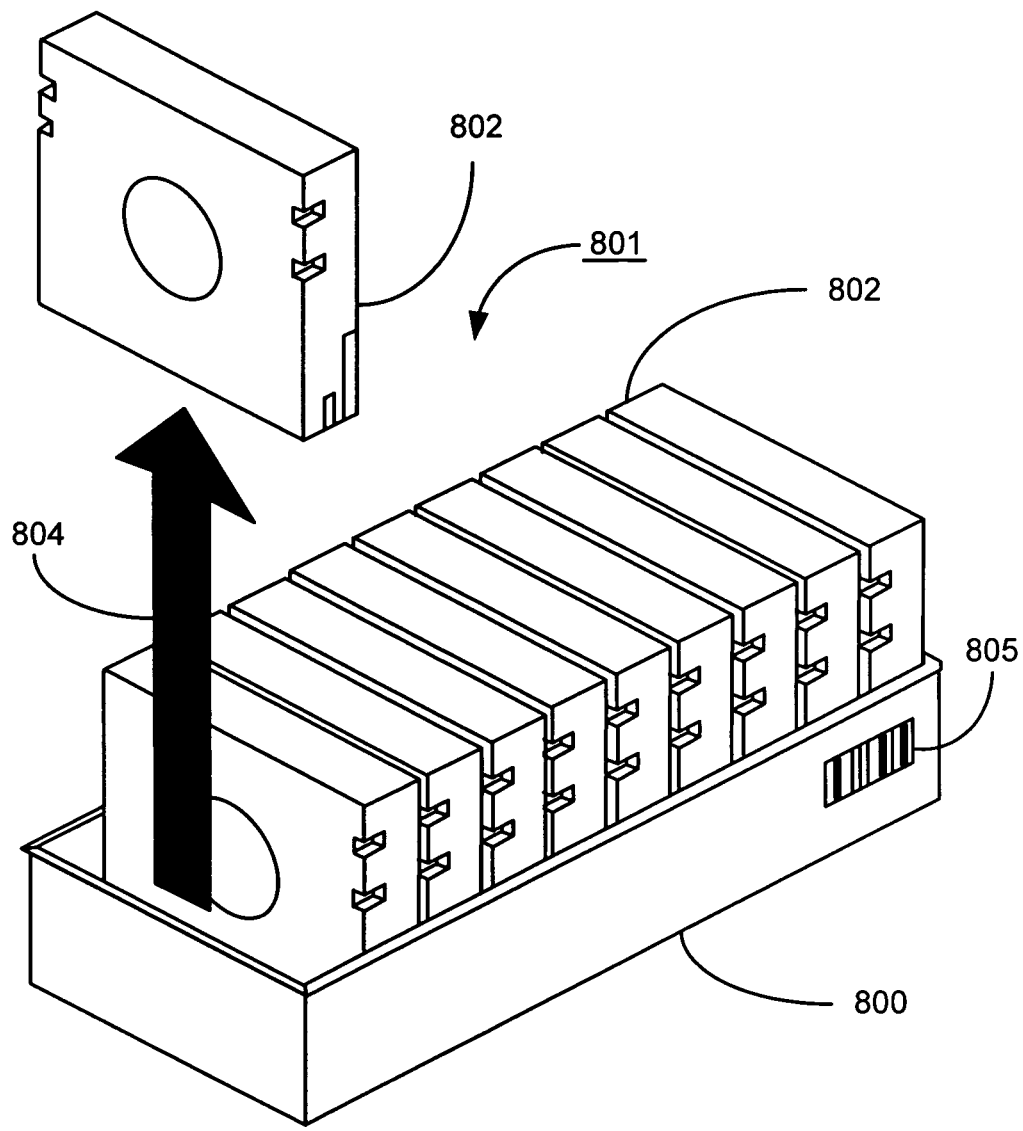
FIG. 8A shows a tape cassette magazine comprising tape cassettes consistent with some embodiments of the present invention.
Figure 8B:
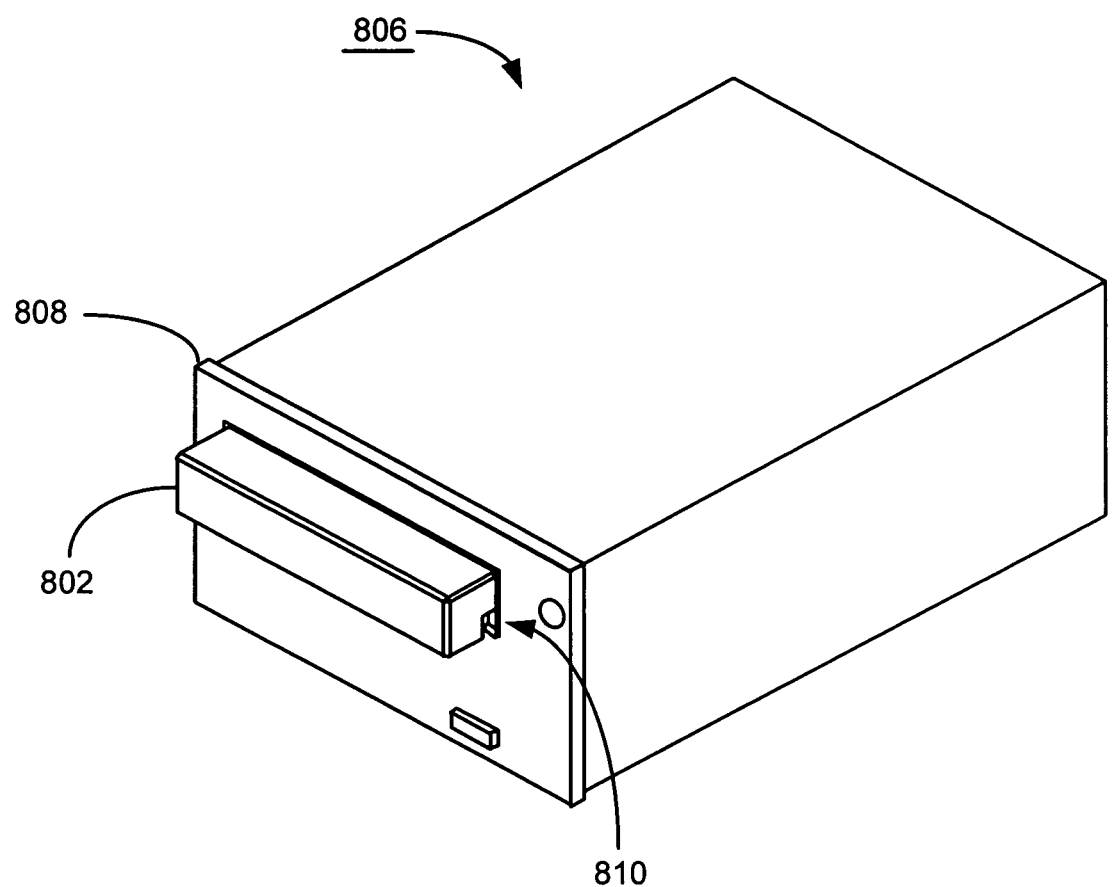
FIG. 8B shows a tape drive cooperating with a tape cassette consistent with some embodiments of the present invention.

With reference to FIG. 8A, shown therein are tape cassettes 802 supported by a tape cassette magazine 800 which are alternative embodiments of a mobile storage medium. In more detail, a tape cassette 802, such an LTO category tape cassette manufactured by IBM of Armonk, N.Y., comprises magnetic tape that is capable of storing digital data written by a compatible drive 806, such as an LTO tape drive manufactured by IBM, when in cooperation (i.e. loaded) with the tape cassette 802 as shown in FIG. 8B. The tape drive 806 is adapted to receive the tape cassette 802 in an accommodating opening 810 in the face 808 of the tape drive 806. FIG. 8A shows a populated tape cassette magazine 801 wherein a magazine support structure 666 (of FIG. 6D) is capable of holding a plurality of tape cassettes 802 disposed in the tape cassette magazine 800. A tape cassette 802 can be removed from the tape cassette magazine 800, as shown by the arrow 804, and inserted in to the tape drive 806 by means of a picker device (not shown). Disposed on the tape cassette magazine 800 is a bar code identifier 805 adapted to identify the tape cassette magazine 800 which has utility should the tape cassette magazine 800 be archived in a media pack storage vault, for example.

Referring to FIG. 6A shown therein is an exterior view of the T950 library 600. Details regarding the illustrative T950 library 600 are described in U.S. Ser. No. 10/605,222 "Magazine Based Library" the disclosure of which is incorporated by reference herein. The T950 library 600 substantially defines a box-like structure that substantially encases the library of FIGS. 6B-6E. The front surface 614 comprises an operator interface (such as a graphical user interface of the type described in connection with, for example, FIG. 2) that is implemented with a touch screen 612, and a grill structure 616 that covers the fans 632 for promoting air circulation within the T950 library 600. The front surface 1214 is removable so that the library 600 can be cascaded with at least one add-on unit to expand the library 600. The viewable side surface 604 shows a first clear panel 628 that allows an operator to view the interior of the library 600. The top surface 608 of the library 600 includes a pair of knockouts 606 and 602 that can be used to receive one or more AC cables that are connected to the power supply 648 and/or one or more computer cables that are used to connect the T950 library 600 to a host computer. Associated with the bottom surface 620 are casters (not shown) that facilitate movement of the T950 library 600 and adjustable stands (not shown) that allow the T950 library 600 to be leveled after the T950 library 600 has been positioned in a relatively permanent location. Further associated with the bottom surface 620 are openings (not shown) for receiving one or more AC cables that are connected to the power supply 648 and/or a computer cable(s) that are used to connect the T950 library 600 to a host computer.

With reference to FIG. 6B, shown therein is the T950 library 600 without the enclosure as shown in FIG. 6A. Generally, the T950 library 600 comprises a first shelf system 630 that is adapted to support a plurality of the mobile media 701 and 801 archived by the library 600. In one embodiment of the present invention, the footprint of a tape cassette magazine 800 and a disc drive magazine 701 are substantially identical for compatibility when archiving in the first shelf system 630 or moving the mobile media 701 and 801 within the library 600. The T950 library 600 further comprises a user definable space 636 capable of comprising additional shelf space 638 for mobile media 701 and 801 and/or space dedicated for drives, such as tape drive(s) 806 and/or disc drive magazine docking station(s) 702. Functionally interposed between the user definable space 636 and the first shelf system 630 is a magazine transport space 634. The magazine transport space 634 is adapted to provide adequate space for a magazine 701 and 801 to be moved from a position in the first shelf system 630, for example, to a drive, such as a tape drive 806. Magazines 701 and 801 can be transferred into and out from the T950 library 600 via an embodiment of an entry/exit port 642. Transferring magazines 701 and 801 in an out of the T950 library 600 can be accomplished by an operator for example. The T950 library 600 comprises a means for cooling as shown by the fans 632 (embodiment), located at the base of the library 600.

With reference to FIG. 6C, shown therein is the T950 library 600 without the enclosure of FIG. 6A (rotated 180°) exposing the user definable space 636. The user definable space 636, herein, shows a column of additional shelves 638 for archiving media 701 and 801, a block of four disc drive magazine docking stations 702, a block of four tape drives 806 and additional vacant user definable space 650. The T950 library 600 also comprises an embodiment of a controller bridge circuit 646, the Spectra Logic FQIP 646 (Fiber channel Quad Interface Processor), and an embodiment of the power supply 648 capable of converting AC current to DC current for consumption by the library 600.

With reference to FIG. 6D, shown therein is an interior sectioned view of the T950 library 600 showing the first shelf system 630. An embodiment of a magazine transport 662 is shown herein with a populated tape cassette magazine 801 resting on top of a magazine support platform 666 under the influence of gravity. In this embodiment, the magazine support 666 comprises a means to pull a magazine 701 or 801, such as a hook and conveyor device, from the first shelf system 630 onto the magazine support 666 wherein the magazine support 666 remains in a substantially stationary position throughout the process. Once on the magazine support 666, a magazine 701 or 801 can be positioned substantially anywhere in the magazine transport space 634 by the magazine transport 662.

FIG. 6E is an interior sectioned view of the T950 library 600 showing the user definable space 636. As illustratively shown the column of additional shelf space 638 is populated with both disc drive and populated tape cassette magazines 701 and 801. The block of four disc drive magazine docking stations 702 and the block of four tape drives 806 and additional vacant user definable space 150 comprises the space adjacent to the column of additional shelf space 638. The magazine transport 662 is capable of positioning a magazine, such as a disc drive magazine 701, to be loaded by a loading means into a docking station 702 wherein the magazine support 666, in one embodiment, remains in a substantially stationary position throughout the process.

The T950 library 600 is capable of bridging communication between at least two different communications protocols on either side of the FQIP 646. The FQIP 646 functions as a combination bridge controller device enabling communication between the T950 library 600 and a client in a fiber channel protocol, for example, and communication from the FQIP 646 to a drive, such as one of the four docking stations 702, for example, in a SCSI channel protocol. Furthermore, the FQIP 646 is adapted to direct data for storage on a specific drive, such as the docking station 702, from a plurality of drives, such as the other seven tape drives 806 and docking stations 806 and 702. Directing data traffic may be necessary should the T950 library 600 be divided into partitions wherein a first client may be allocated a first partition, or fraction, of the library's 600 storage capacity and resources (for example 60 percent of the storage space within the library 600) and a second client allocated the remainder of the library's 600 storage capacity and resources (for example 40 percent of the storage space within the library 600) in a second partition.

In accordance with the present invention, the FQIP 646 can be modified to include at least one Hifn encryption/decryption chip, such as the 7956 or 8155 class chip from Hifn Inc., of Los Gatos, Calif., for example. Each Hifn chip is adapted to encrypt and decrypt small packets of data (up to, for example, 32 K-byte data packets) because the Hifn chips are designed for network to network applications. Consequently, the FQIP 646, in one embodiment, generally comprises at least one CPU (Central Processing Unit), at least one volatile memory chip, a PCI bus, at least one Hifn chips, at least one fibre chips and at least one SCSI chips to accommodate the 32 K-byte data packets. Generally, data received are segmented in software into data packets no larger than 32K-bytes and sent to the Hifn chip for encryption and then reassembled with meta data for each 32K data packet and sent to the drive, via the SCSI chip as one (slightly larger than the original) tape write command. To elaborate for purposes of illustration, data is received from a client, such as in a steaming tape format, by a fibre chip which in turn sends to the memory chip in 64 K-byte packets. Once in volatile memory, the 64K-bytes of data are segmented in to 32 K-byte data packets and sent along with an Initialization Vector (IV), which introduces a random element to each data packet for additional security, key to the Hifn chip for encryption. The encrypted 32K-byte data packets are then reassembled in the volatile memory along with the meta data, which includes the moniker associated with the key and MAC data unique to each data packet, and sent to the mobile media via the SCSI chip. For decryption, the encrypted data and meta data are retrieved from the storage media and put into the volatile memory whereby the encrypted data packets along with the IV, MAC and key identified by the moniker from the meta data are transmitted to the Hifn chip for decryption and then reassembled back to the original streamed form in the volatile memory for transmission to the client. As one skilled in the art will appreciate, data libraries routinely store several G-bytes of data at a time.

The FQIP 646 is linked via a CAN with a graphic user interface that is accessible by an operator using the library 600. The graphic user interface 612 is a medium through which an operator can input storage options such as number and size of partitions, moniker associated with the key (wherein the key, in one embodiment, can be internally uniquely generated), backup routines, etc. The graphic user interface 612 can further be used to configure the FQIP 646 to optionally encrypt data intended for a particular partition, such as the second partition 108 of FIG. 1, for example. In an alternative embodiment, the graphic user interface 612 can further be used to configure the FQIP 646 to optionally compress and encrypt data intended for a particular partition.

In one embodiment consistent with the present invention, a first data package is received by a client over a fiber channel pathway to the FQIP 646 for storage in a first partition of the library 600 allocated to a first client. The first data package is buffered then encrypted by a Hifn encryption chip comprised by the FQIP 646 in 32 K-byte packets and transmitted to a drive in cooperation with a mobile storage medium, such as the tape drive 806 and tape cassette 802, allocated to the first client's partition. In addition to the encrypted data packets, a moniker associated with a decryption key capable of decrypting the data packets and a MAC capable of verifying proper decryption are transmitted for storage by the FQIP 646 on the tape cassette 802. The MAC can be generated by the Hifn chip that encrypts the data. The moniker can be a nickname such as 'SALLY', for example, and can be used to quickly identify the associated decryption key which can be one from a set of a plurality of decryption keys. In this embodiment, the moniker is stored in plain text (i.e. non-encrypted data) in the memory allocated space and the decryption key is stored exclusively in the library 600. Upon creation of the key, a user, for example, can request a key associated with the moniker "SALLY" whereby a key can be randomly and uniquely generated for that moniker. "SALLY" cannot be used twice within the same library partition because every moniker will be associated with a uniquely generated key. In one embodiment, the first client need not be aware that their first data is stored in an encrypted format. In this embodiment, management of an encryption key may be solely done by the library 600, for example. The library 600 can further be configured to comprise a second partition for use with a second client wherein second data stored for the second client is not encrypted by the Hifn chip, but rather is stored in the 'as received' form from the second client. An 'as received' form is the form in which the data is received by the FQIP from the client, which is generally in plain text but may however be in an encrypted form or compressed form or both, for example.

Upon a requested to decrypt the data, such as by the client, the key comprising the decryption code required to decrypt the data can be identified by use of the moniker stored on the media. Once the moniker is read, the T950 library 600 can provide the decryption key enabling decryption of the data. In some alternative embodiments, the key can exist with the client or with a third party, for example. The encryption key can be changed in desired increments of time such as every week, for example. The encryption key can be different for each client, data package received, etc.

The MAC is used as a means to verify that the data when decrypted is identical to the data that was originally received from the client prior to encryption. In the event the decrypted data has been corrupted or changed from when the data was originally received by the client, an error will be sent to the client that the data has not been successfully decrypted, or in the case where a client is unaware of encrypted data, a retrieval error will be sent.

In one embodiment, a moniker is not needed; rather the verification from the HMAC that the data has been successfully decrypted can be used. In this option, the set of keys used for encryption can be tried in succession, for example, until the data has been verified as decrypted.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple monikers can be used with multiple keys for one set of data to increase complexity in security, for example, while still maintaining substantially the same functionality without departing from the scope and spirit of the present invention. Another example can include using these techniques in addition to data compression in a same chip, to name a few examples while still maintaining substantially the same functionality without departing from the scope and spirit of the present invention. Further, though communication is described herein as between a client 102 and the library, such as the library 100, communication can be received by the drive, such as the first drive 104, via the combination bridge controller device 114, for example, without departing from the scope and spirit of the present invention. Further, for purposes of illustration, a first and second drive and media are used herein to simplify the description for a plurality of drives and media. Finally, although the preferred embodiments described herein are directed to disc drive systems, such as the disc drive magazine 701, and tape storage systems, such as tape cassettes 802 and tape drives 806, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A data storage device comprising:
a first and second drive;
a first and second mobile storage medium, each including memory space for storing data;
a first and second partition wherein the first partition comprises the first drive and the first mobile storage medium and the second partition comprises the second drive and the second mobile storage medium;
a combination bridge controller device, including one or more processor and an encryption engine, configured to:
control first communication traffic between at least a first client and the first partition wherein the first communication traffic can comprise a first data package;
receive the first data package from the client for storage on the first mobile storage medium in cooperation with the first drive; and
optionally encrypt the receive the first data package prior to storing;
the first mobile storage medium configured to receive the encrypted first data package and specific to the first data package; and
the data storage device is further configured to:
receive a request form a client for accessing the first data package, the request comprising, a message authentication code (MAC) and a moniker associated with a decryption key;
retrieve the decryption key with the associate moniker;
access the encrypted first data package from the first mobile storage medium;
decrypt the first encrypted data package;
compute a MAC of the decrypted first data package, and validated the computed MAC with the received MAC for authenticity and integrity of the decrypted data; and
transmit the first encrypted data package to the client in response to the client's request.

2. The data storage device of claim 1 wherein the combination bridge controller device is further configured to control a second communication traffic between a second client and the second partition wherein the second communication traffic can comprise a second data package and to store the second data package in an encrypted form on the second mobile storage medium in cooperation with the second drive.

3. The data storage device of claim 1 wherein the combination bridge controller device is further configured to control a second communication traffic between the first client and the second partition wherein the second communication traffic can comprise a second data package and to store the second data package as plain text on the second mobile storage medium in cooperation with the second drive.

4. The data storage device of claim 1 wherein the combination bridge controller device is further configured to compress the first data package for storage on the first mobile storage medium.

5. The data storage device of claim 1 further comprising a third partition comprising a third drive and a third mobile storage medium configured to receive a third data packet from the combination bridge controller device in a form selected from the group consisting of: plain text, encrypted text, compressed text, or a combination thereof.

6. The data storage device of claim 1 wherein the first partition further comprises a plurality of mobile storage media and drives.

7. The data storage device of claim 1 wherein the combination bridge controller device is configurable by a user interface comprised by the data storage library.

8. The data storage device of claim 1, wherein the MAC is based on cryptographic hash functions.

9. The data storage device of claim 1, wherein knowledge of the decryption key and the moniker is known by at least the data storage library.

10. The data storage device of claim 1 wherein the mobile storage medium is selected from one of the group consisting of: a tape cartridge, disc drive magazine, optical compact disc, flash memory device, magnetic disc drive, magneto-optical drive and floppy disc drive.

11. A method performed by a data storage device, the method comprising the steps of:
 partitioning, by a combination bridge controller device, the library into at least a first and second partitions wherein each of the partitions comprise at least one drive and one mobile storage medium;
 controlling, by combination bridge controller device, first communication traffic between at least a first client and the first partition wherein the first communication traffic can comprise a first data package;
 receiving, by combination bridge controller device, the first data package from the client for storage on the first mobile storage medium in cooperation with the first drive;
 optionally encrypting, by combination bridge controller device, the received first data package prior to storing;
 receiving, by the first mobile storage medium, the encrypted first data package and specific to the first data package;
 receiving, by the data storage device, a request form a client for accessing the first data package, the request comprising, a message authentication code (MAC) and a moniker associated with a decryption key;
 retrieving, by the data storage device, the decryption key with the associate moniker;
 accessing, by the data storage device, the encrypted first data package from the first mobile storage medium;
 decrypting, by the data storage device, the first encrypted data package;
 computing, by the data storage device, a MAC of the decrypted first data package, and validated the computed MAC with the received MAC for authenticity and integrity of the decrypted data; and
 transmitting, by the data storage device, the first encrypted data package to the client in response to the client's request.

12. The method of claim 11, wherein the decryption step is accomplished by the combination bridge controller device.

13. The method of claim 11, wherein the method further comprising step of buffering the first data package; dividing the first data package into discrete data blocks; encrypting the discrete data blocks; storing the encrypted discrete data blocks on the first mobile storage medium with meta data associated with each of the encrypted discrete data blocks.

14. The method of claim 13, wherein the method further comprising step of performing the method step of decrypting the encrypted discrete data blocks and reassembling the decrypted discrete data blocks back into the data package.

15. The method of claim 11, wherein the method further comprising step of configuring the combination bridge controller device to transmit a second data package intended for storage in the second partition in a data format from the group consisting of: encrypted data, plain text data, compressed data.

* * * * *